United States Patent
Takagi et al.

(10) Patent No.: US 7,126,950 B2
(45) Date of Patent: Oct. 24, 2006

(54) METHOD AND SYSTEM FOR TRANSMISSION AND RECEPTION OF ASYNCHRONOUSLY MULTIPLEXED SIGNALS

(75) Inventors: Kazuo Takagi, Tokyo (JP); Naoya Henmi, Tokyo (JP); Shinobu Sasaki, Tokyo (JP); Kurenai Murakami, Tokyo (JP); Motoo Nishihara, Tokyo (JP); Yoshinori Rokugou, Tokyo (JP)

(73) Assignee: NEC Corporation, Tokyo (JP)

( * ) Notice: Subject to any disclaimer, the term of this patent is extended or adjusted under 35 U.S.C. 154(b) by 961 days.

(21) Appl. No.: 09/782,879

(22) Filed: Feb. 13, 2001

(65) Prior Publication Data

US 2001/0046232 A1  Nov. 29, 2001

(30) Foreign Application Priority Data

Feb. 14, 2000  (JP)  .............................. 2000-035584

(51) Int. Cl.
*H04L 12/28* (2006.01)
*H03M 13/00* (2006.01)

(52) U.S. Cl. .................. 370/395.5; 370/392; 714/746; 714/776

(58) Field of Classification Search ................ 370/392, 370/252, 474, 395.1, 395.5, 395.52, 395.6, 370/395.61, 714; 714/701, 786, 752, 758, 714/774–785, 798, 746
See application file for complete search history.

(56) References Cited

U.S. PATENT DOCUMENTS

| | | | | |
|---|---|---|---|---|
| 5,568,477 A | * | 10/1996 | Galand et al. | ........... 370/395.6 |
| 5,570,362 A | * | 10/1996 | Nishimura | ................ 370/395.1 |
| 5,764,876 A | * | 6/1998 | Yanagisawa et al. | ....... 714/758 |
| 5,771,249 A | * | 6/1998 | Yanagisawa | ................ 714/798 |
| 6,038,694 A | * | 3/2000 | Swallow | ..................... 714/781 |
| 6,138,264 A | * | 10/2000 | Nava et al. | .................. 714/785 |
| 6,151,320 A | * | 11/2000 | Shim | ..................... 370/395.61 |
| 6,189,124 B1 | * | 2/2001 | Glaise | ........................ 714/781 |
| 6,317,433 B1 | * | 11/2001 | Galand et al. | ............... 370/474 |
| 6,331,978 B1 | * | 12/2001 | Ravikanth et al. | ........... 370/474 |
| 6,611,522 B1 | * | 8/2003 | Zheng et al. | ............. 370/395.5 |

OTHER PUBLICATIONS

Okutani et al., Journal of the Electronic Information and Communication Society, vol. 80, No. 10, pp. 1043-1049 (1997).

(Continued)

*Primary Examiner*—Steven Nguyen
(74) *Attorney, Agent, or Firm*—Dickstein, Shapiro, LLP.

(57) ABSTRACT

A storage circuit defines a first field for storing first header bits of a first payload signal of a first data unit, a second field, and a third field for storing the first payload signal. The first header bits are equal in number to second header bits of a second payload signal of a second data unit. A division circuit divides the first header bits by a generator polynomial to produce a first error check code. The same generator polynomial is used to divide the second header bits to produce a second error check code. A remainder of division of hypothetical header bits by the generator polynomial is summed to the first error check code to produce a sum which is inserted into the second field of the storage circuit. The hypothetical header bits are greater in number than a total number of bits in the first and second fields, so that the first and second data units can be distinguished from each other by different error check results of the first and second data units.

46 Claims, 13 Drawing Sheets

OTHER PUBLICATIONS

Takeshita et al., "An Introduction to Mastering TCP/IP" and "Chapter 3.13: IP Headers", Ohm Company, First Edition (Jun. 24, 1994).

Copy of Japanese Office Action dated Dec. 10, 2003 (and English translation of relevent portion).

* cited by examiner

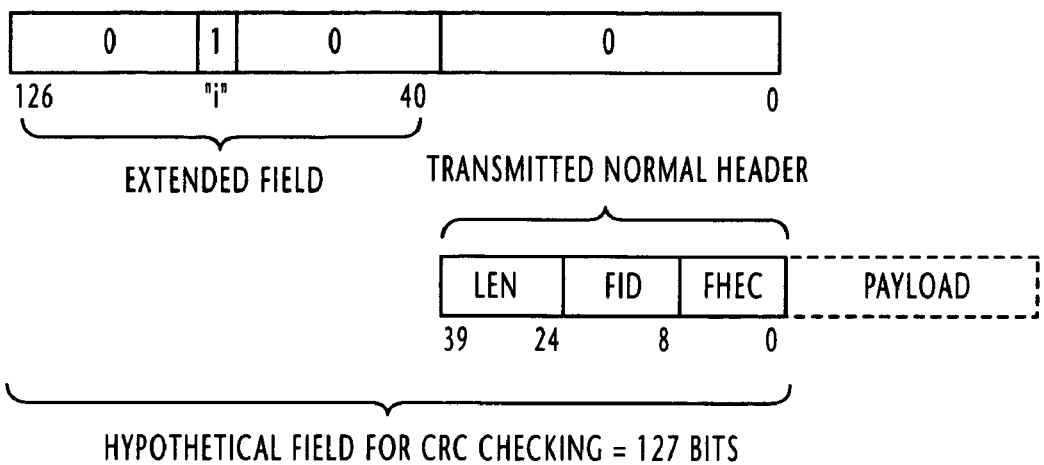
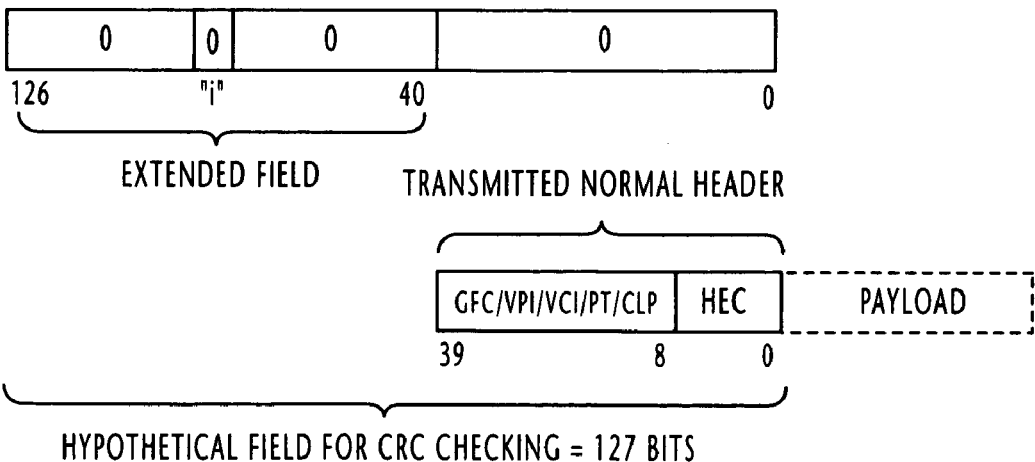

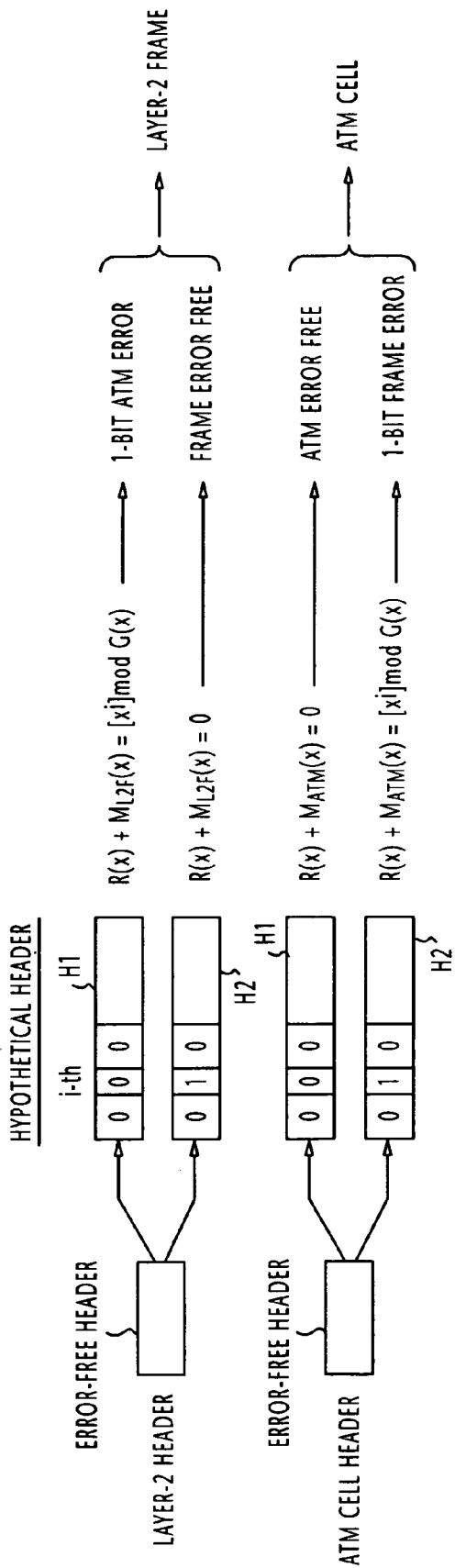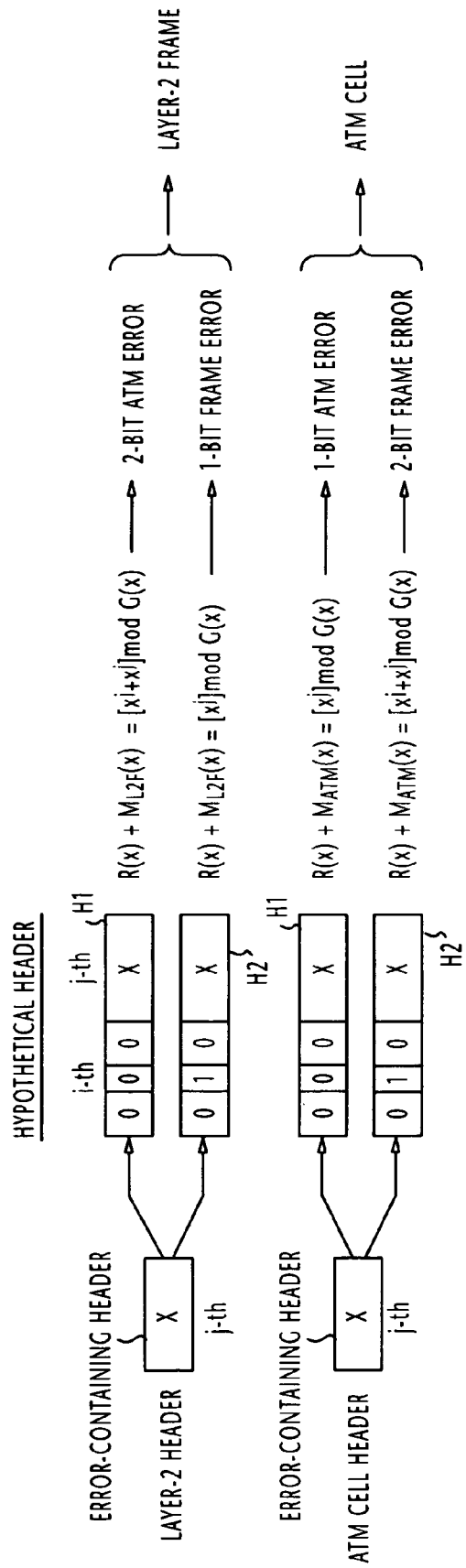
FIG. 3A
FIG. 3B

LAYER-2 FRAME ASSEMBLER

ATM CELL ASSEMBLER

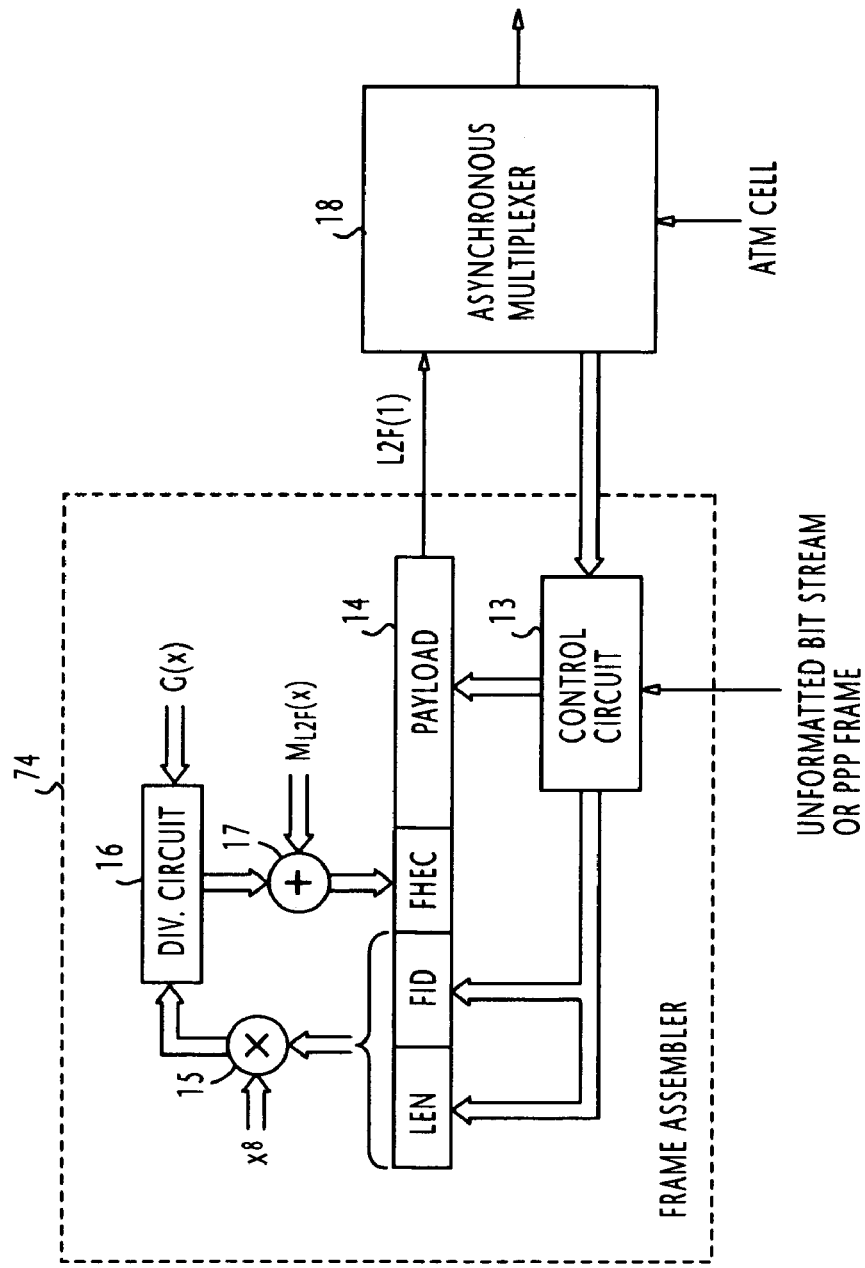

METHOD AND SYSTEM FOR TRANSMISSION AND RECEPTION OF ASYNCHRONOUSLY MULTIPLEXED SIGNALS

BACKGROUND OF THE INVENTION

1. Field of the Invention

The present invention relates generally to communications systems and more specifically to a method and system for transmission and reception of asynchronously (statically) multiplexed signals onto a common transmission medium. The present invention is particularly useful for asynchronously multiplexing data units of different format such as ATM cells and frames (i.e., layer-2 frames) in which IP (Internet Protocol) packets are encapsulated.

2. Description of the Related Art

Demand for high speed communication systems is increasing to meet multimedia communications services (audio, video and the Internet). Physical interfaces for implementing high speed communications have been deployed to provide a wide range of different services corresponding to networks of different architecture. For multimedia communications, ATM (asynchronous transfer mode) cells are the most promising data format for transporting user traffic as a multimedia platform. In addition, high-speed transport interfaces are increasingly used for interfacing high-capacity routers. However, there is an increasing amount of processing burden on the transport interfaces for assembling data traffic into ATM cells and disassembling ATM cells to original format. The transport interfaces thus represent a bottleneck for high speed transmission. One solution to this problem is the use of point-to-point protocol (PPP) frames in the transport interface. However, a need will arise to multiplex PPP frames with ATM cells over a transmission system such as SONET (synchronous optical network. Because of their difference in data format, PPP frames and ATM cells must be segmented into bytes and alternately multiplexed onto synchronized time slots. However, it is impossible to control the allocated bandwidths according to traffic needs. Alternatively, WDM (wavelength division multiplexing) technique may be used to carry PPP frames and ATM cells on different wavelengths to be multiplexed onto a common optical link. However, efficient resource utilization cannot be achieved because of the inability to control the allocated bandwidth according to varying traffic. In addition, the use of two wavelengths represents a waste of one wavelength which could be otherwise used for other high speed traffic.

In addition, a need may exist for asynchronously multiplexing data units of same format but different lengths.

SUMMARY OF THE INVENTION

It is therefore an object of the present invention to provide a method and system for asynchronously multiplexing data units regardless of their original data structure and their data length.

The object of the present invention is obtained by forming data units so that the header of each of the data units contains an equal number of physical header bits and an header error check code resulting from division of the physical header bits by an identical generator polynomial and then summing to the header error check code a remainder of division of hypothetical header bits by the generator polynomial, the hypothetical header bits being greater in number than the physical header bits.

According to one aspect of the present invention, there is provided a communication method comprising the steps of receiving a first data unit containing first header bits of a first payload signal and a first error check code representing a remainder of division of the first header bits by a generator polynomial, the first header bits being equal in number to second header bits of a second payload signal of a second data unit, the generator polynomial being used to divide the second header bits to produce a second error check code, and summing a remainder of division of hypothetical header bits by the generator polynomial to the first error check code, the hypothetical header bits being greater in number than the first header bits, whereby the first and second data units can be distinguished from each other by different error check results of the first and second data units.

The hypothetical header bits are composed of higher significant bits of non-zero value and all-zero lower significant bits, the lower significant bits being equal in number to the first header bits plus the error check code. Further, the hypothetical header bits may correspond in number to the maximum degree of an irreducible polynomial.

At a transmit site, the first and second data units are asynchronously multiplexed onto a common medium and transmitted to a receive site. At the receive site, an error check is performed on the header bits of the multiplexed signal by using the same generator polynomial as that used in the transmit site to produce a first result. A second result is produced by summing to the first result the same second remainder as that produced at the transmit site. Depending on the first and second results, a decision is made as to whether the received signal corresponds to the first data unit or the second data unit.

The receive site identifies the received signal as a first data unit when it detects the presence of a one-bit error in the first result and no bit error in the second result and identifies the received signal as a second data unit when it detects the presence of a one-bit error in the second result and no bit error in the first result. Further, the receive site identifies the received signal as a first data unit when it detects the presence of a two-bit error in the first result and a one-bit error in the second result and identifies the received signal as a second data unit when it detects the presence of a two-bit error in the second result and a one-bit error in the first result.

In a practical aspect, the first data unit is a layer-2 frame in which layer-3 packets are encapsulated and the second data unit is an ATM cell. The generator polynomial is $x^8+x^2+x+1$ which is used to divide the hypothetical header bits which may extend up to 127 bits. Specifically, the hypothetical header bits are composed of all-zero lower-significant bits which are in the range from the 0-th to the 39-th bit position corresponding to the first header bits, and higher-significant bits of non-zero value which are in the range from the 40-th to the 126-th bit position. A constant value $(=x^7+x^5+x^3+1)$ is added to the first error check code of the layer-2 frame as well as to the second error check code of the ATM cell. At the receive site, an error check is performed on the header bits of a multiplexed data unit by using the generator polynomial $x^8+x^2+x+1$ to produce a result. A sum of the constant value and the second remainder as those used at the transmit site is added to the result to produce a first added result, and the same second remainder is added to the result to produce a second added result. Depending on the first and second added results, a decision is made as to whether the received signal is a layer-2 frame or an ATM cell.

The amount of information carried by the multiplexed first data unit may be limited when the second data unit is requesting high quality of service and an idle data unit may be transmitted when the first and second data units are not present on the common medium. The second data units may be transmitted immediately following the start timing of a superframe and the first data units follow when the second data units are requesting high quality of service.

According to another aspect, the present invention provides a communication method comprising the steps of producing, for a first payload signal of a first data unit, first header bits equal in number to second header bits of a second payload signal of a second data unit, dividing the first header bits by a generator polynomial to produce a first error check code, the generator polynomial being equal to a generator polynomial with which the second header bits are divided to produce a second error check code, producing a sum of a remainder of division of hypothetical header bits by the generator polynomial to the first error check code, the hypothetical header bits being greater in number than the second header bits, and forming the first data unit with the second header bits, the sum and the first payload signal, whereby the first and second data units can be distinguished from each other by different error check results of the first and second data units.

According to a further aspect, the present invention provides a communication method which comprises transmitting a first data unit containing first header bits, a first error check code and a first payload signal through a transmission medium, and receiving the first data unit through the transmission medium and producing a sum of a remainder of division of hypothetical header bits by that generator polynomial to the first error check code, the hypothetical header bits being greater in number than the first header bits, and reformulating a first data unit with the first header bits, the sum and the first payload signal, whereby the reformulated first data unit can be distinguished from a second data unit by different error check results of the first and second data units, wherein the second data unit contains second headers equal in number to the first header bits, a second error check code resulting from division of the second header bits by that generator polynomial.

According to a still further aspect, a first data unit is transmitted from a transmit site through a transmission medium, the first data unit containing header bits and a sum of a first error check code resulting from division of the first header bits with a generator polynomial and a remainder resulting from division by that generator polynomial of hypothetical header bits greater in number than the first header bits. The first data unit is received by a receive site, where that remainder is subtracted from the received first data unit, whereby the received first data unit is converted to a data unit which can be distinguished from a data unit which is identical in format to the received first data unit.

According to a still further aspect, the present invention provides a communication circuit comprising a storage circuit including a first field for storing first header bits of a first payload signal of a first data unit, a second field containing a first error check code resulting from division of the first header bits by a generator polynomial, and a third field for storing the first payload signal, the first header bits being equal in number to second header bits of a second payload signal of a second data unit, and the generator polynomial being used to divide the second header bits to produce a second error check code, and an adder circuit for summing a remainder of division of hypothetical header bits by the generator polynomial to the first error check code, the hypothetical header bits being greater in number than a total number of bits in the first and second fields, whereby the first data unit can be distinguished from each other by different error check results of the first and second data units.

According to a still further aspect, the present invention provides a communication circuit comprising a storage circuit including a first field for storing first header bits of a first payload signal of a first data unit, a second field, and a third field for storing the first payload signal, the first header bits being equal in number to second header bits of a second payload signal of a second data unit, and the generator polynomial being used to divide the second header bits to produce a second error check code, division circuitry for dividing the first header bits by the generator polynomial to produce a first error check code, and an adder for summing a remainder of division of hypothetical header bits by the generator polynomial to the first error check code to produce a sum and inserting the sum into the second field of the storage circuit, the hypothetical head bits being greater in number than a total number of bits in the first and second fields, whereby the first and second data units can be distinguished from each other by different error check results of the first and second data units.

According to a still further aspect, the present invention provides a communication circuit comprising a storage circuit including a first field for storing first header bits of a first payload signal of a received first data unit, a second field containing a first error check code which equals a sum of a first remainder resulting from division of the first header bits by a generator polynomial and a second remainder resulting from division of hypothetical header bits by the generator polynomial greater in number than the first header bits, and a third field for storing the first payload signal, the first header bits being equal in number to second header bits of a second payload signal of a second data unit, and the generator polynomial being used to divide the second header bits to produce a second error check code of the second data unit, whereby the first and second data units can be distinguished from each other by different error check results of the first and second data units, and a subtractor circuit for subtracting the second remainder from the first error check code of the received first data unit, whereby the received first data unit is converted to a data unit which can be distinguished from a data unit identical in format to the received first data unit by different error check results.

A storage circuit may be further provided for receiving a data unit containing a payload, header bits and a sum of an error check code resulting from division of the header bits by a generator polynomial and a remainder of division of hypothetical header bits greater in number than the header bits. A subtractor circuit is provided for subtracting the remainder from the sum of the received data unit, whereby the received data unit is converted to a first data unit which can be distinguished from a second data unit identical in format to the received data unit by different error check results of the first and second data units.

BRIEF DESCRIPTION OF THE DRAWINGS

The present invention will be described in detail further with reference to the following drawings, in which:

FIGS. 1 and 2 are schematic illustrations for describing hypothetical headers used respectively for layer-2 frames and ATM cells which are statistically multiplexed according to the present invention;

FIGS. 3A and 3B are schematic illustrations of bit errors which can occur in the multiplexed sequence of ATM/frame hybrid signals for purposes of their discrimination at a receiver (demultiplexer);

FIGS. 10, 11 and 12 are block diagrams showing details of FIGS. 9A, 9B and 9C, respectively;

DETAILED DESCRIPTION

Figure 4:
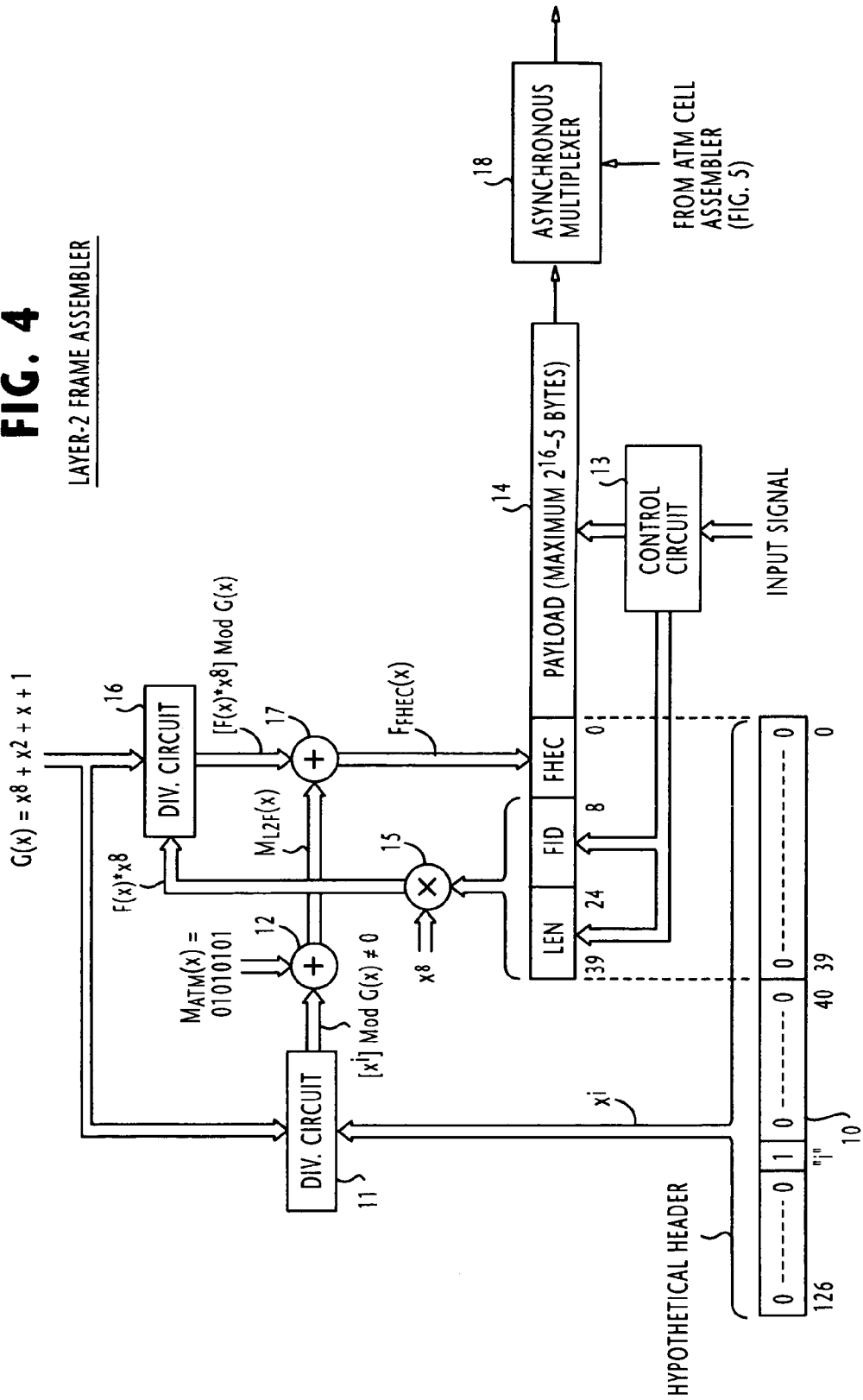
FIG. 4 is a block diagram of a logical layer-2 frame assembler useful for describing the present invention.

It has been recognized that CRC-based framing has several advantages over flag-based framing. The present invention is based on the CRC-based framing protocol that uses the same generator polynomial for the same number of header bits regardless of the frame length. For the purpose of disclosure, the following description is concerned with the asynchronous multiplexing of ATM cells and layer-2 frames over a common medium. It should be understood that frames of same format are discussed below could equally be multiplexed.

FIG. 1 illustrates the layer-2 frame format of the present invention. The layer-2 frame is composed of a 40-bit normal header and a payload field. The normal header of the layer-2 frame contains a length (LEN) field, a frame identifier (FID) field and a frame header error check (FHEC) field. The length field is a 2-byte field which is used to indicate the length of the payload and the FID field which is also of 2-byte field to indicate the frame type, payload format and QoS. Frame header error check field is a one-byte field, located at the fifth byte from the beginning of the frame, which is the same position as the header error check (HEC) field of ATM cell.

In order to distinguish between layer-2 frames and ATM cells in a received signal, the FHEC field contains the sum of a header CRC sequence computed over all header bits in the LEN and FID fields plus an additional CRC check sequence. This additional CRC check sequence is computed over a 127-bit hypothetical header that is composed on an all-zero lower significant bit portion (0-th to 39-th) corresponding to the 40-bit physical header (including the HEC field) and a non-zero higher significant bit portion that extends over the 40-th bit to the 126-th bit. The header CRC sequence and the additional CRC sequence are generated by the same CRC-8 polynomial $G(x)=x^8+x^2+x+1$ which is used to generate the CRC sequence for the header error check (HEC) field of an ATM cell. The additional CRC sequence is the remainder of division of a 127-bit hypothetical, extended header $x^i$ (where i is between the 40-th and 126-th bit of the hypothetical header) by the generator polynomial G(x). The CRC result computed over the first four bytes from the beginning of the head in a layer-2 frame differs from the equivalent result computed over the first four bytes of an ATM cell.

The generator polynomial G(x) that is used in ATM CRC is transformed to an irreducible polynomial of the form:

$$G(x)=x^8+x^2=x+1=(x+1)(x^7+x^6+x^5+x^4+x^3+x^2+1) \quad (1)$$

According to the Hamming code theory, when the maximum degree of an irreducible polynomial is m, the bit range to which "1-bit error detection/correction" can be applied extends up to $(2^m-1)$ bits. With m=7, the bit range extends up to 127 bits, including the length of the 40-bit normal header. This feature is used in layer-2 centric and layer-2/ATM hybrid transport schemes. The CRC operates over an "hypothetical header" that extends to 127 buts, with the first 40-bit portion being set to all zeros. In the layer-2 frame, the i-th bit, one of the extended bits, is a "1" as shown in FIG. 1. In the ATM scheme, however, all of the extended bits are set zero as shown in FIG. 2. Each of the FHEC and HEC fields are dependent on the results of the CRC on each of these hypothetical headers. The hypothetical headers are used only for CRC computation, and they are not transmitted or received.

The error check codes, or polynomials $F_{FHEC}(x)$ and $F_{HEC}(x)$ in the FHEC and HEC fields are obtained as follows:

$$F_{FHEC}(x) = [F(x)*x^8 + x^i]\text{Mod}G(x) + \\ \text{modulo}(x) - [F(x)*x^8]\text{Mod}G(x) + \\ \text{modulo}(x) + [x^i]\text{Mod}G(x) \quad (2)$$

$$F_{HEC}(x)=[F(x)*x^8]Mod\ G(x)+\text{modulo}\ (x) \quad (3)$$

$$F_{FHEC}(x)=F_{HEC}(x)+[x^i]Mod\ G(x) \quad (4)$$

where F(x)=the first four bytes of the frame/cell header, and modulo (x) is the bit sequence "01010101" which is used in the ATM CRC scheme.

In the following discussion, modulo (x) will be referred to as $M_{ATM}(x)$ for convenience. Note that $M_{ATM}(x)$ is used as a preferred modulo for synchronizing the cell start timing, or cell delineation. $F_{HEC}(x)$ and $F_{FHEC}(x)$ are thus represented as:

$$F_{HEC}(x)=[F(x)*x^8]Mod\ G(x)+M_{ATM}(x) \quad (5)$$

$$F_{FHEC}(x)=[F(x)*x^8]Mod\ G(x)+M_{L2F}(x) \quad (7)$$

where, $M_{L2F}(x)=M_{ATM}(x)+[x^i]Mod\ G(x)$.

A receiver can easily distinguish between the two types of hypothetical headers even if layer-2 frames and ATM cells are multiplexed "frame by frame", i.e., asynchronously into a common channel. Since the HEC value is the same as that computed over a normal 40-bit length ATM header, the use of an hypothetical header does not affect standard interfaces.

The receiver extracts layer-2 frames and ATM cells as shown in FIGS. 3A and 3B. When a header is received, the receiver performs a CRC process on the received 40-bits header and adds the fixed values $M_{L2F}(x)$ and $M_{ATM}(x)$ to the resultant remainder R(s) to reconstitute and ATM hypothetical header H1 and a layer-2 hypothetical header H2, and then performs an error check on the hypothetical headers to identify the type of header.

When receiving an error-free layer-2 frame (L2F) header, as shown in FIG. 3A, the receiver detects an i-th bit error in the ATM hypothetical header H1 from the CRC-based result. Since the i-th bit is not sent through the transport channel, this error should not occur. Therefore, the receiver recognizes it as an uncorrectable error in an ATM hypothetical header. On the other hand, the receiver detects no error in the layer-2 hypothetical header H2, thus recognizing the received header as a layer-2 frame header.

When receiving an error-free ATM cell header, the receiver detects an i-th bit error in the layer-2 frame hypothetical header H2. Since this i-th bit is not sent through the transport channel, this error does not occur. The receiver recognizes it as an uncorrectable error in a layer-2 frame hypothetical header. On the other hand, the receiver detects no error in the ATM hypothetical header H1, thus recognizing the received header as an ATM cell header.

When receiving a layer-2 frame header with a one-bit error (i.e.,j-th bit error), as shown in FIG. 3B, the receiver can detect a correctable one-bit error (i.e., j-th bit error) in the layer-2 hypothetical header H2 and an uncorrectable two-bit error (i.e., i-th and j-th bit errors) in the ATM hypothetical header H1. The receiver uses the error-checking result to determine that the received header is for a layer-2 frame and proceeds to correct the bit error.

When receiving an ATM cell header with a one-bit error (j-th bit error), the receiver can detect a correctable one-bit error (j-th bit error) in the ATM hypothetical header H1 and an uncorrectable two-bit error (i-th and j-th bit errors) in the layer-2 hypothetical header H2. The receiver uses the error-checking result to determine that the received header is for an ATM cell and proceeds to correct the bit error.

After the header is identified, the receiver starts looking for the current layer-2/ATM boundary. If the received header is for a layer-2 frame, the receiver can identify the end of the current frame boundary by referring to its LEN field. If it is for an ATM cell, the receiver can find its cell boundary by simply jumping 48 bytes ahead.

Referring now to FIG. 4, there is shown a logical structure of a layer-2 frame assembler of the present invention. The logical layer-2 frame assembler includes a 127-bit register 10, in which the layer-2 hypothetical header $x^i$ (where "i" is between the 40-th and 126-th bit positions) is stored. A division circuit 11 is connected to the register 10 for dividing all bits of the register by the generator polynomial $G(x)=x^8+x^2+x+1$ (i.e., "100000111") to produce a remainder of non-zero value $[x^i]$ Mod $G(x) \neq 0$. The ATM modulo $M_{ATM}(x) = x^7+x^5+x^3+1$ (=01010101) is summed in an adder 12 to the output of the division circuit 11 to produce the layer-2 modulo $M_{L2F}(x)$.

On the other hand, an input traffic signal is supplied to a control circuit 13 which segments the signal into blocks of appropriate length (with a maximum of $2^{16}-5$ bytes) and appends 2-byte length information and a 2-byte frame identifier to each segmented block. A shift register 14 is provided, which is segmented into LEN, FID, FHEC and payload fields corresponding to the frame format to store the length information and the frame identifier into the LEN and FID fields, respectively, and the segmented block into the payload field. The four-byte information F(x) of the LEN and FID fields are multiplied by a bit sequence $x^8$ (=10000000) in a multiplier 15. A remainder $[F(x)*x^8]$ Mod G(x) is then produced in a division circuit 16 by dividing the output of the multiplier 15 by the generator polynomial G(x). The header error check code $F_{FHEC}(x)$ is formed in an adder 17 by summing together the outputs of division circuit 16 and adder 12 and stored in the FHEC field of the shift register 14. When all the necessary information are stored in the shift register 14, they are forwarded to an asynchronous multiplexer 18.

Figure 5:
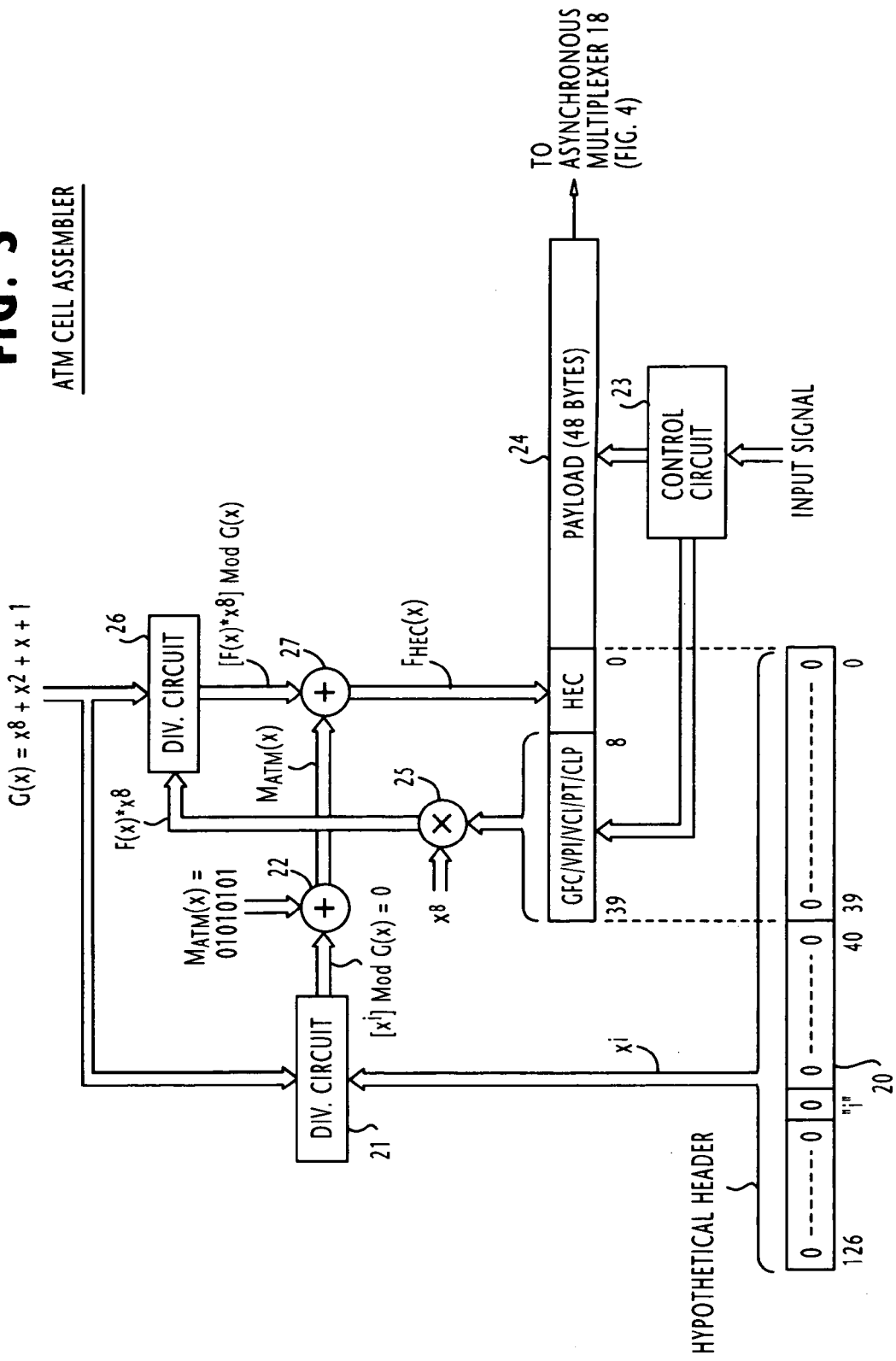
FIG. 5 is a block diagram of a logical ATM cell assembler useful for describing the present invention.

FIG. 5 shows a logical structure of an ATM cell assembler. The logical ATM cell assembler includes a virtual 127-bit register 20, in which the ATM hypothetical header (i.e., all zero bits) are stored. A virtual division circuit 21 is connected to the register 20 for dividing all bits of the register by the generator polynomial $G(x)=x^8+x^2+x+1$ to produce a remainder $[x^i]$ Mod $G(x)=0$. The ATM module $M_{ATM}(x)$ is summed in a virtual adder 22 to the zero-output of the virtual division circuit 21.

On the other hand, an input traffic signal is supplied to a control circuit 23 which formulates a 48-byte payload signal and 4-byte header information (GFC/VPI/VCI/PT/CLP) and stores them into a shift register 24. The four-byte cell header information F(x) are multiplied by a bit sequence $x^8$ in a multiplier 25 and a remainder $[F(x)*x^8]$ Mod G(x) is then produced in a division circuit 26 by dividing the output of the multiplier 25 by the generator polynomial G(x). The header error check code $F_{HEC}(x)$ is formed in an adder 27 by summing together the outputs of division circuit 26 and virtual adder 22 and stored in the HEC field of the shift register 24.

When all the necessary information are stored in the shift register 24, they are forwarded to the asynchronous multiplexer 18, where ATM cells are statistically (asynchronously) multiplexed with layer-2 frames onto a common channel in a manner as will be described in detail later.

The multiplexed bit stream is transmitted over the common channel to a distant receive site where a demultiplexer is provided for distinguishing between layer-2 frames and ATM cells.

Figure 6:
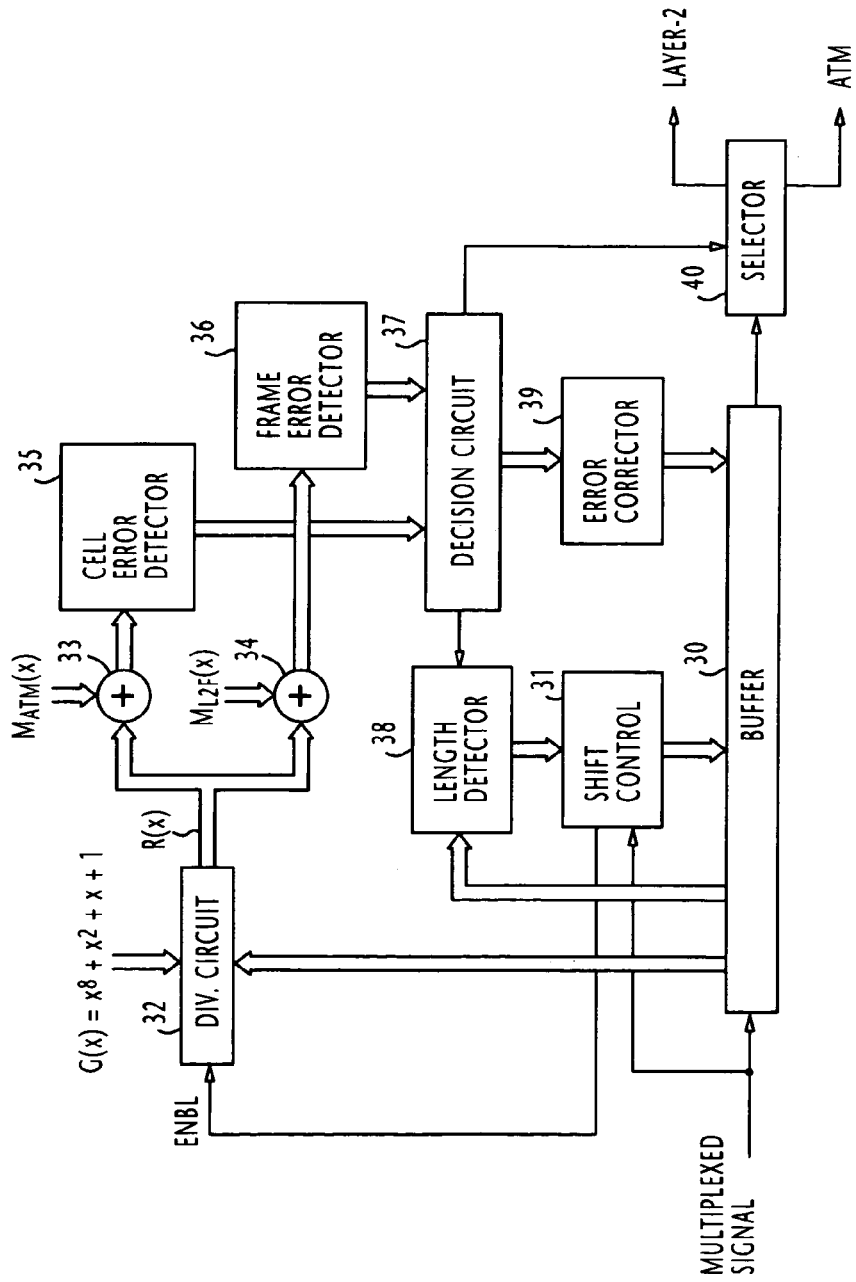
FIG. 6 is a block diagram of a practical demultiplexer of the present invention.

One example of the demultiplexer is shown in FIG. 6. The multiplexed bit stream is input to a buffer 30 and a shift controller 31. Shift controller 30, which is preset by a length detector 38, counts the number of input bits and decrements the preset value by the count number of the bits stored in the buffer 30. Shift controller 31 supplies an output representing the remaining count value to the buffer 30 as a shift control signal.

When the first five-byte header bits from the beginning of a frame/cell boundary are stored in the buffer 30, the shift controller 31 enables a division circuit 32 to divide the five-byte header information (including the header error check code) by the generator polynomial G(x). The remainder R(x) of the division is supplied to adders 33 and 34 where modulo constants $M_{ATM}(x)$ and $M_{L2F}(x)$ are added to the remainder R(x). If no bit error exists, the output of each adder is zero. Otherwise, a non-zero value is produced. Error detectors 35 and 36 examine the outputs of adders 33 and 34 and determines whether an error exists in the header bits. If a correctable error exists, the error detectors identify its bit position, and communicates their results to a decision circuit 37.

According to a frame sync algorithm described below, the decision circuit 37 analyzes the outputs of error detectors 35 and 36 and determines whether the header is for a layer-2 frame or an ATM cell depending on the number of bit errors.

When a decision has been made as to the frame format, the decision circuit 37 directs an error corrector 39 to correct one-bit error and informs the length detector 38 of the identified frame format. If the header is identified as a frame header, the length detector 38 reads length information from the LEN field of the frame stored in the buffer 30 and directs the shift controller 31 to shift the contents of the buffer 30 by an amount corresponding to the length of the payload field of the frame. If the header is identified as an ATM cell header, the length detector 38 directs the shift controller 31 to shift the contents of the buffer 30 by the fixed value of 48 bytes. The payload bits stored in the buffer 30 are now forwarded through a selector 40 to one of its outputs depending on a control signal supplied from the decision circuit 37.

Figure 7:
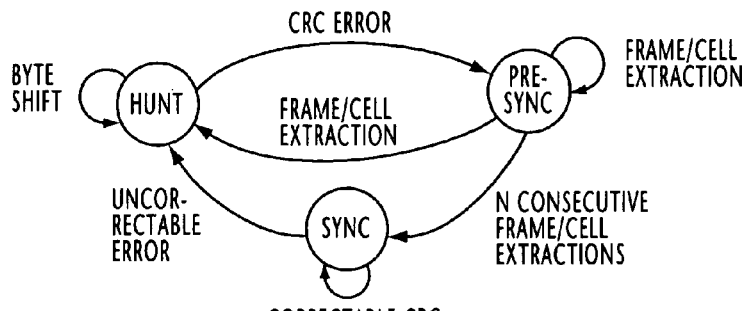
FIG. 7 is a state diagram for describing the operation of the decision circuit of FIG. 6.

In order to enable the extraction of layer-2 frames and ATM cells, frame synchronization is provided by the decision circuit 37. FIG. 7 illustrates the transition from an initial state, called "byte hunting state", to the frame synchronized state, called "sync state". In the byte hunting state, the decision circuit 37 searches for the boundary with the next layer-2 frame or ATM cell by moving forward one byte at a time. First, the decision circuit supposes that the current incoming byte is the beginning of a new layer-2 frame or ATM cell and then checks the first five-byte sequence from that byte for a match with a valid layer-2 frame or ATM header. If the five-byte sequence appears to be a layer-2 or ATM header, the decision circuit tentatively supposes that it has found the frame or cell boundary and enters a pre-sync state. Otherwise, it shifts one byte forward and returns to the byte-hunting state. In the pre-sync state, the decision circuit checks the first five bytes from the next boundary. When the decision circuit detects N consecutive layer-2 headers or ATM headers, it enters the sync state. If the decision circuit fails to find the headers before N consecutive headers and detected, it returns to the byte-hunting state. In the sync state, the layer-2 frames/ATM cells are extracted. If an uncorrectable error occurs, the decision circuit leaves the sync state and enters the byte-hunting state.

Figure 8:
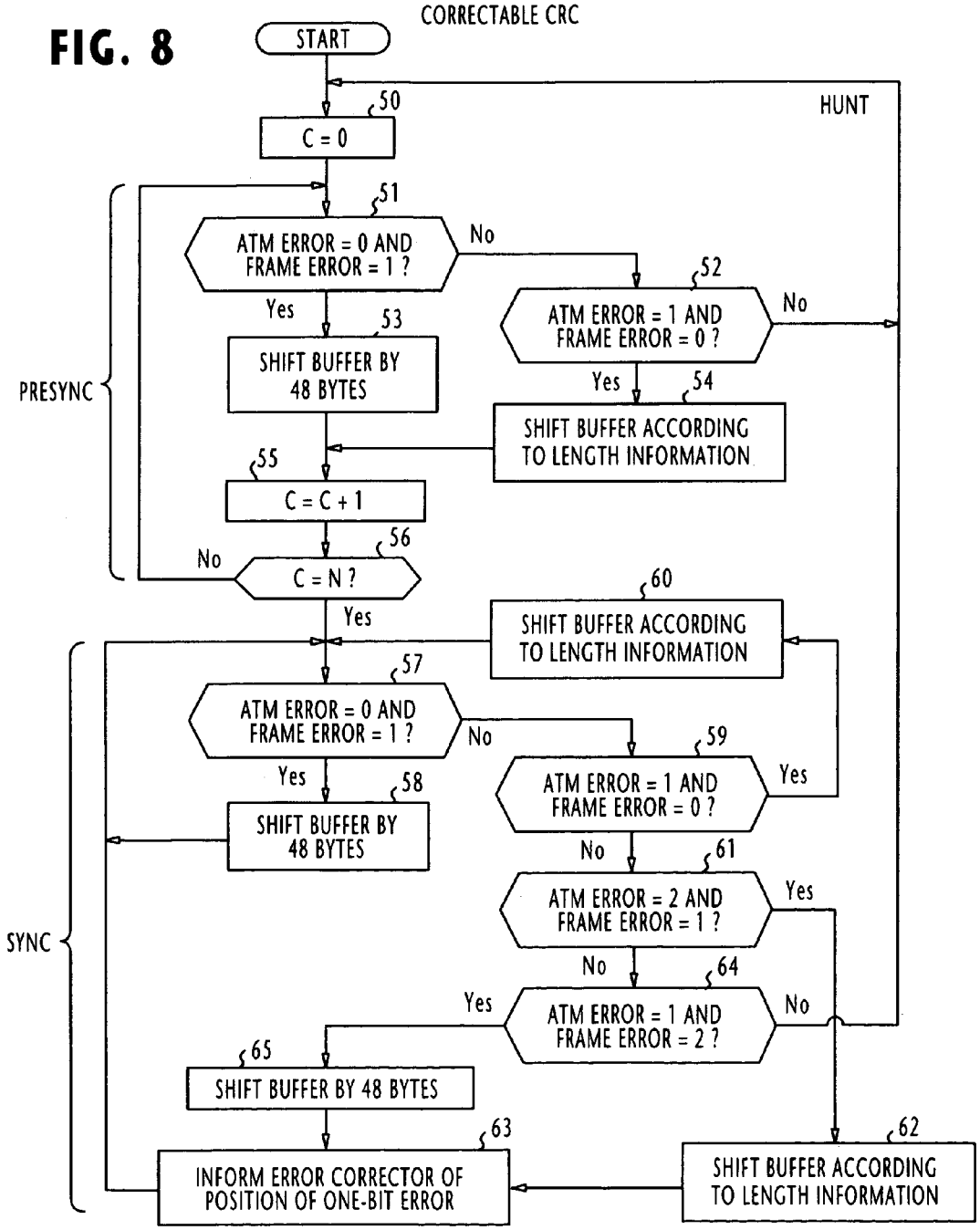
FIG. 8 is a flowchart of the operation of the decision circuit.

FIG. 8 shows details of the operation of the decision circuit 37. Frame sync algorithm starts with initialization step 50 in which the count value C for counting N consecutive headers is set to zero. At step 51, the decision circuit checks to see if no ATM error and a one-bit frame error exist. If so, the decision circuit informs the length detector 38 that the header is for an ATM cell and directs the selector 40 to choose the lower output path (step 53). In response, the length detector 38 directs the shift controller 31 to move the contents of the buffer 30 by 48 bytes, so that the header of the next frame/cell is shifted to the position of the shift register 30 to which the division circuit 32 is connected. If the decision at step 51 is negative, the routine proceeds to step 52 to check to see if a one-bit ATM error and no frame error exist at the same time. If so, the decision circuit informs the length detector 38 that the header is for a layer-2 frame and directs the selector 40 to choose the upper output path (step 54). In response, the length detector 38 reads length information from the LEN field of the current frame and directs the shift controller 31 to move the contents of the buffer 30 by the length of the payload field, so that the header of the next frame/cell is brought to the position of the shift register 30 to which the division circuit 32 is connected. If the decision at step 52 is negative, flow returns to the starting point of the routine and steps 50, 51 and 52 will be repeated as long as the demultiplexer is in the byte-hunting state.

Following step 53 or 54, the count value C is incremented by one (step 55). Steps 51 to 55 are repeated until the count value C is incremented to N (step 56) as long as the decision circuit is in the pre-sync state.

When the count value C is equal to N, it is determined that frame/cell extractions have occurred consecutively N times and flow proceeds from step 56 to step 57. The demultiplexer now enters the sync state. At step 57, the decision circuit checks to see if no ATM error and a one-bit frame error exist. If so, the header is for an ATM cell and flow proceeds to step 58 to shift the buffer contents by 48 bytes, forwards them through the selector 40 to the lower data path, and returns to step 57. If the decision at step 57 is negative, the decision circuit tests to see if there is a one-bit ATM error and no frame error exists (step 59). If so, the header is for a layer-2 frame and the routine proceeds to step 60 to shift the buffer contents by the payload length of the frame and returns to step 57. As long as the demultiplexer is in the sync state, steps 57 to 60 will be repeatedly executed.

If the decision at step 59 is negative, flow proceeds to step 61 to test for the presence of a two-bit ATM error and a one-bit frame error. If this is the case, the header is identified as a layer-2 frame header and the buffer contents are shifted by the length of its payload (step 62) and the decision circuit directs the error corrector 39 to correct the one-bit frame error (step 63), and returns to step 57.

If the decision at step 61 is negative, flow proceeds to step 64 to test for the presence of a one-bit ATM error and a two-bit frame error. If this is the case, the header is identified as an ATM header and the buffer contents are shifted by 48 bytes (step 65) and the decision circuit directs the error corrector 39 to correct the one-bit ATM error (step 63), and returns to step 57.

When the demultiplexer loses synchronism with the incoming bit stream, it returns to the byte-hunting state. In this case, the decision circuit exits from step 64 and returns to the starting point of the routine.

It will be seen from the foregoing that for data units to be asynchronously multiplexed it is only necessary that a hypothetical header is used for only one of these data units. In the above discussed embodiment, the division of the all-zero hypothetical header of the ATM cell does not affect its error check code. Therefore, the hypothetical header is only necessary for layer-2 frames and ATM cells of the current format can be used with no modifications. Additionally, the layer-2 frame can be formulated in separate locations. In the first location, a layer-2 frame is formulated only with the $M_{ATM}(x)$, which is then transmitted to the second location. In the second location, the remainder $[x^7]$ Mode $G(x)=0$ is summed to the FHEC field of the frame so that the frame can be asynchronously multiplexed with ATM cells.

Furthermore, since the remainder of division of the hypothetical header is of constant value, the frame assembler can be simplified by eliminating the use of register 10, division circuit 11 and adder 12 of FIG. 4.

By using the simplified configuration of the frame assembler, a number of practical implementations are possible for formulating layer-2 frames before being statistically multiplexed with ATM cells, as illustrated in FIGS. 9A to 9D.

Figure 9A:
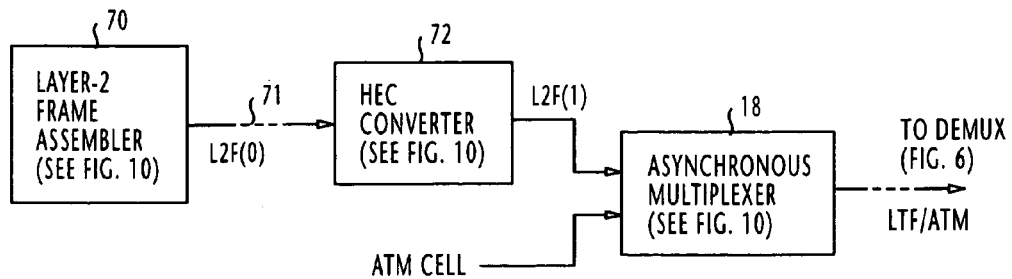
FIGS. 9A to 9D are block diagrams of possible combinations of frame and ATM assemblers and HEC converter as basic elements of the present invention for implementing a communication system.
Figure 9B:
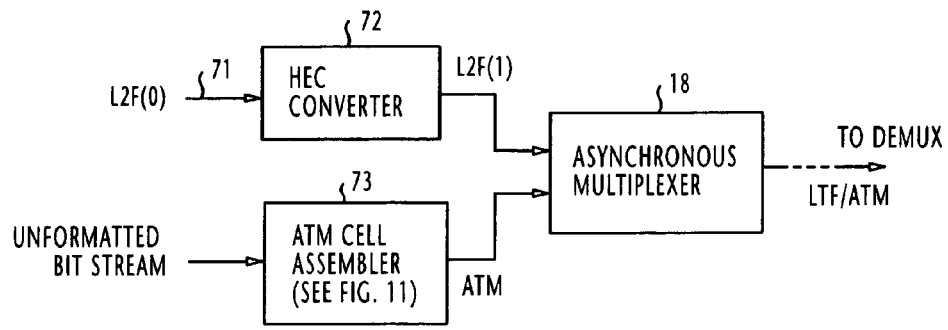

In FIG. 9A, a communication system is illustrated in which a layer-2 frame is initially formulated by a layer-2 frame assembler 70 provided in a first location. The frame is then transmitted through a transmission line 71 to an HEC converter 72 provided in a second location, where the output of the HEC converter 72 is multiplexed with ATM cells by the asynchronous multiplexer 18. The multiplexed signal is transmitted to the demultiplexer of FIG. 6. Details of the communication system of FIG. 9A are shown in FIG. 10.

Figure 10:
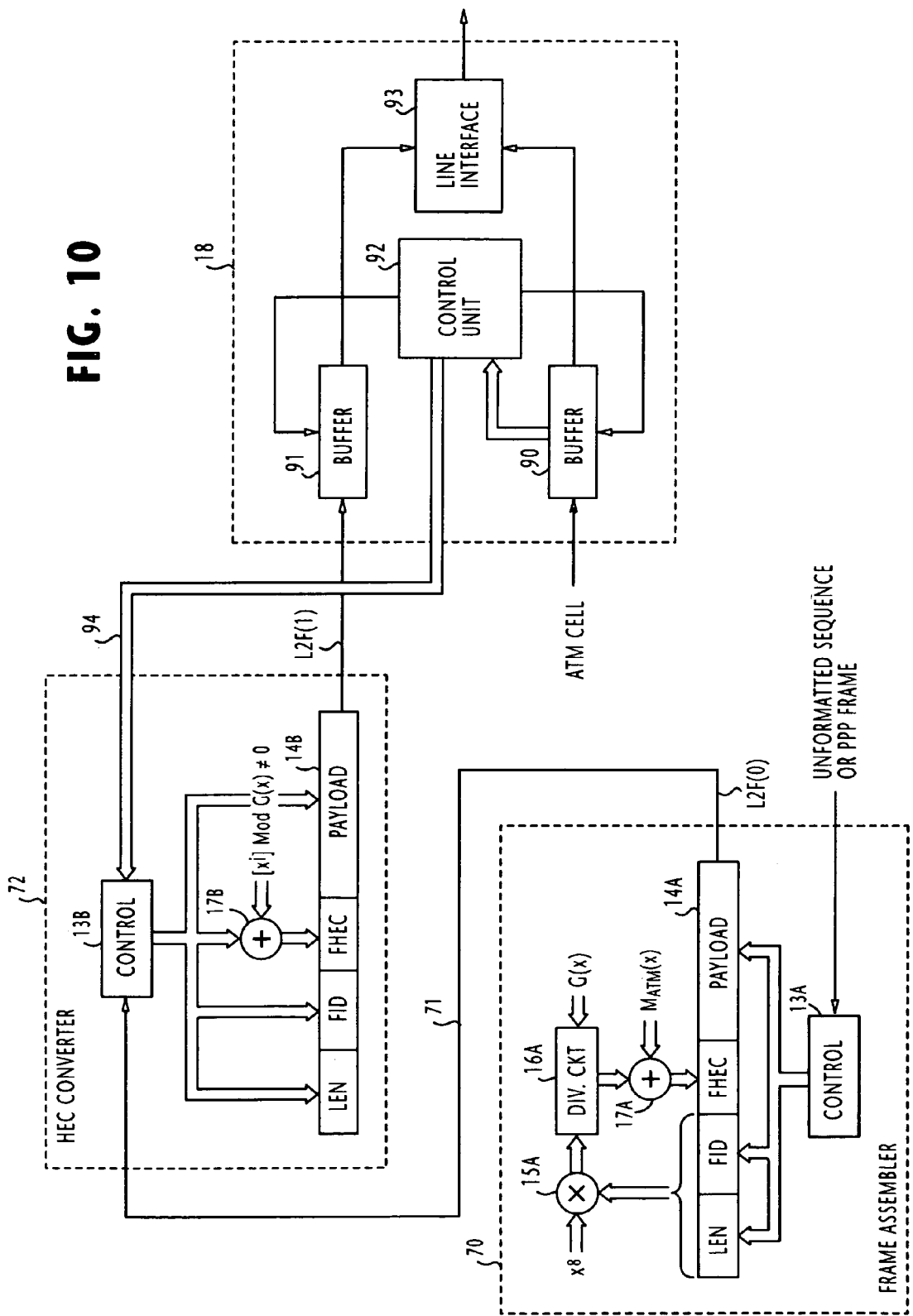

In FIG. 10, the frame assembler 70 is composed of controller 13 which segments an input unformatted bit sequence of PPP frame into a payload signal and produce header information of the payload signal. The header information represents the payload length and the frame identifier. Controller 13A stores these items of information into respective fields of shift register 14A. The information stored in the LEN and FID fields are multiplied by $x^8$ in multiplier 15A and then divided by G(x) in division circuit 16, in the same manner as described. The remainder of the division is fed to an adder 17A where it is summed with the constant value $M_{ATM}(x)$="01010101". The output of the adder 17A is written into the FHEC field of shift register 14A, forming a layer-2 frame (or type 0), which cannot be statistically multiplexed with other data units such as other layer-2 frames or ATM cells.

The frame formulated in the shift register 14 is forwarded onto the transmission line 71 and received by the HEC converter 72 where the controller 13B stores the field data of the frame into corresponding fields of shift register 14B except for the header error check code. This error check code is supplied to adder 17B and summed with the non-zero hypothetical remainder $[x^i]$ Mod G(x) and then stored in the FHEC field of shift register 14B. In this way, the layer-2 frame stored in the shift register 14B is converted to the format (or type-1 format) that can be statistically multiplexed with ATM cells or other layer-2 frames whose header error check code is not summed with the non-zero hypothetical remainder.

The layer-2 frame (type 1) is now forwarded from the HEC converter 72 to asynchronous multiplexer 18A to which ATM cells are also supplied. These signals are statistically multiplexed in a manner as will be described in detail later.

Returning to FIG. 9B, the ITEC converter 72 may be co-located with an ATM cell assembler 73. An unformatted signal is supplied to the ATM cell assembler 73. As shown in detail in FIG. 11, the unformatted signal is segmented by a controller 80 into a 48-byte payload signal and inserted to a payload field of a shift register 81 and an ATM header consisting of GFC, VPI, VCI, PTA and CLP data is formulated and stored in a 4-byte field of the shift register. The 4-byte header information is multiplied by modulo $x^8$ in a multiplier 82 and divided by the generator polynomial G(x) in a division circuit 83 and summed in an adder 84 to a modulo $M_{ATM}(x)$, producing a header error check code, which is stored in the HEC field of shift register 81 to complete an ATM cell. The ATM cell is forwarded to multiplexer 18 where it is multiplexed with layer-2 frames (type 1) from the HEC converter 72 onto a common channel for transmission to the demultiplexer.

Figure 9C:
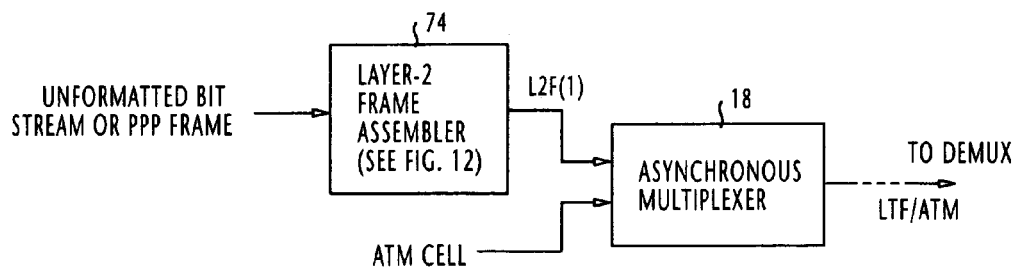

Layer-2 frames of type 1 may be formulated in a single location and multiplexed with ATM cells (FIG. 9C). Layer-2 frame assembler 74, shown in FIG. 12, is a combination of the type-0 assembler 70 and HEC converter 72 of FIG. 10 and is identical to that shown in FIG. 4 except that the virtual register 10, division circuit 11 and adder 12 of FIG. 4 are dispensed with.

Figure 9D:
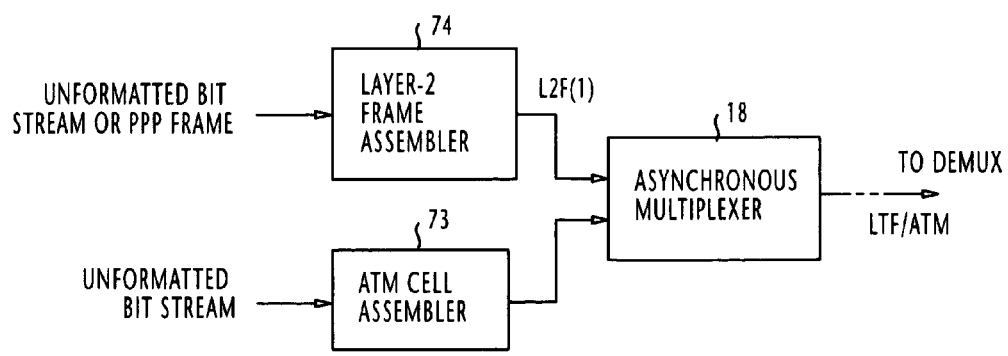
Figure 11:
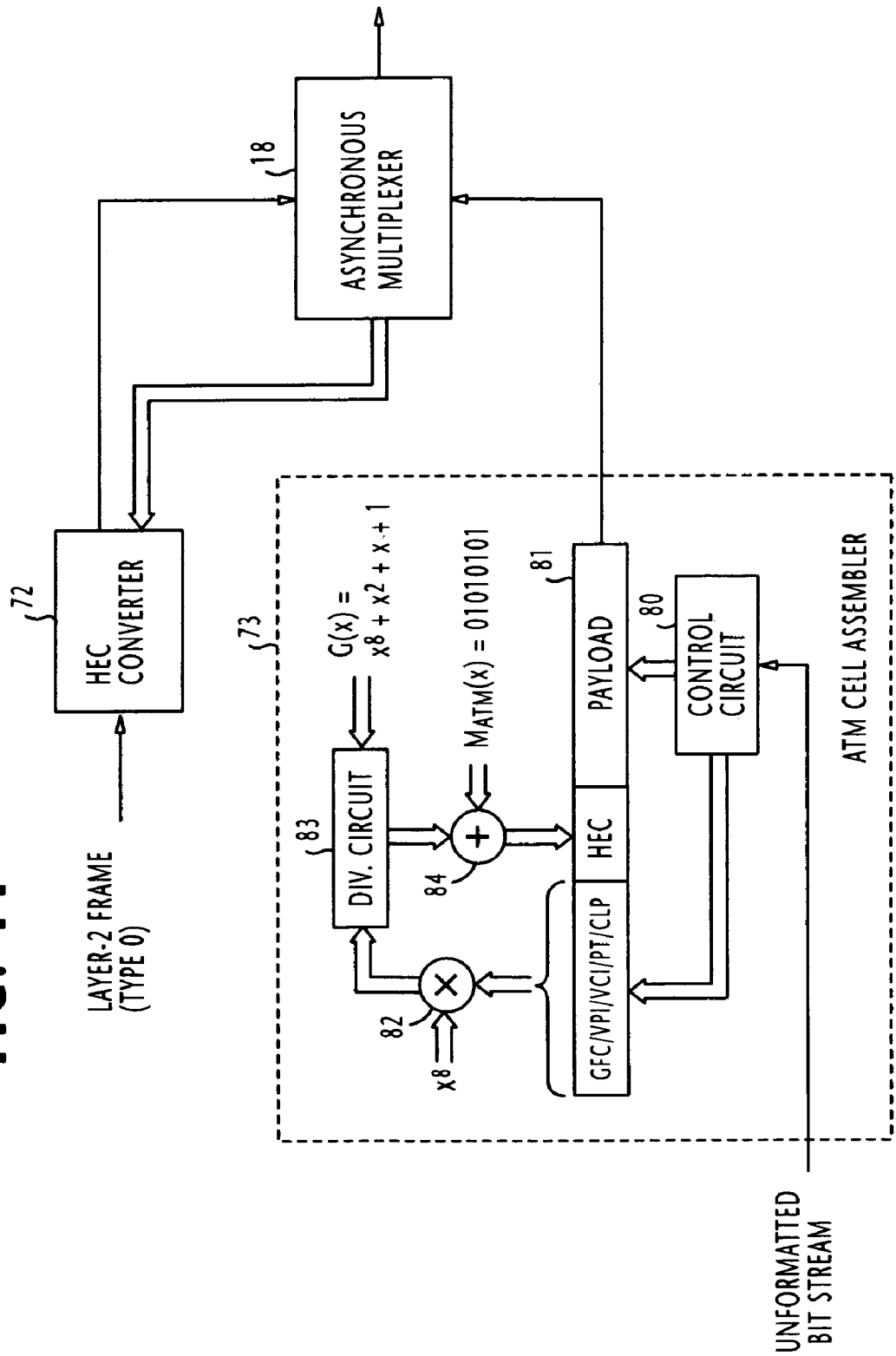

Layer-2 frames of type 1 and ATM cells may be formulated and multiplexed together in a single location as shown in FIG. 9D using the frame assembler 74 (FIG. 12) and the ATM assembler 73 (FIG. 11).

Returning to FIG. 10, the asynchronous multiplexer 18 is comprised of a pair of buffers 90 and 91, a control unit 92 and a line interface 93. Layer-2 frames and ATM cells are stored in the buffers 90 and 91 respectively. Control unit 92 constantly examines the presence of cells in the ATM buffer 90 and their contents if present and controls the traffic of layer-2 frames through a control bus 94.

Figure 13:
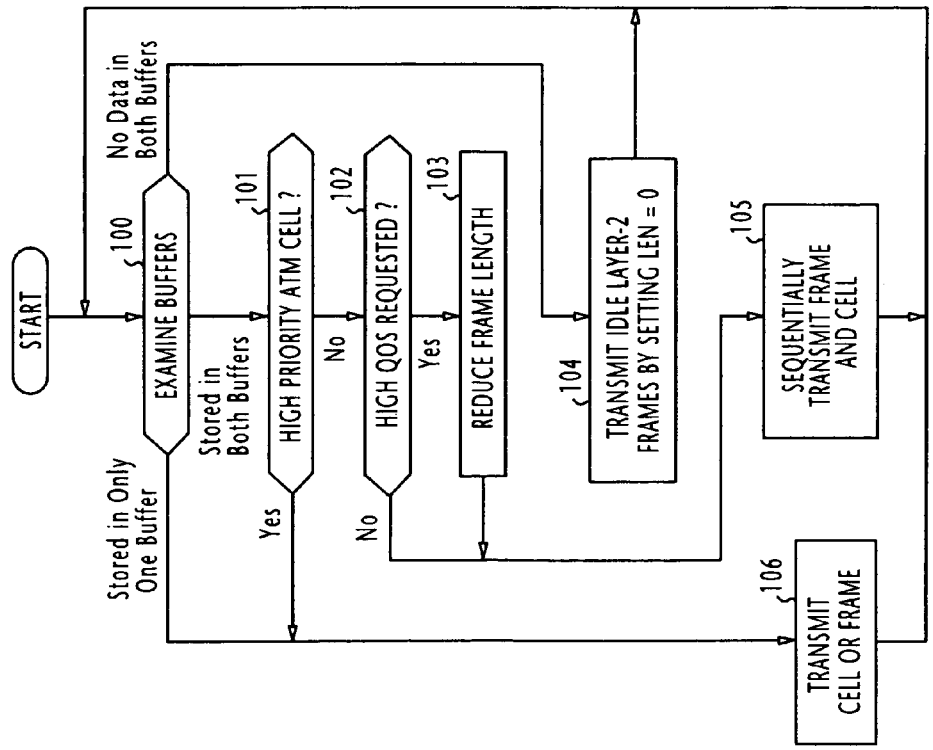

According to one embodiment, the operation of the controller 92 proceeds according to a programmed routine shown in FIG. 13. The routine starts with decision step 100 to determine whether cells/frames are stored in both of the buffers 90 and 91. If so, flow proceeds to step 101 to examine the header of the cell in buffer 90 and determines whether the cell is classified as a high priority cell. If this is the case, the stored ATM cell is forwarded from the buffer 90 to the line interface 93 for transmission (step 106), and flow returns to the starting point of the routine. If the stored cell is not classified as high priority, the routine proceeds from step 101 to step 102 to check to see if high QoS (Quality-of-Service) parameter is contained in the cell header. If the decision is affirmative at step 102, the control unit 92 proceeds to step 103 and directs the controller 13B of the layer-2 frame assembler 72 to reduce its frame length by setting some upper limit, which is shorter than the average length, on length data inserted into the LEN field.

Following a negative decision at step 102 or the execution of step 103, the controller 92 proceeds to step 105 to sequentially transmit the currently frame and cell from the buffers 90 and 91, and returns to the starting point of the routine. If no data is stored in both buffers, flow proceeds from step 100 to step 104 in which the controller 92 formulates and transmits idle layer-2 frames by setting their frame length to zero and repeats the process.

Figure 14:
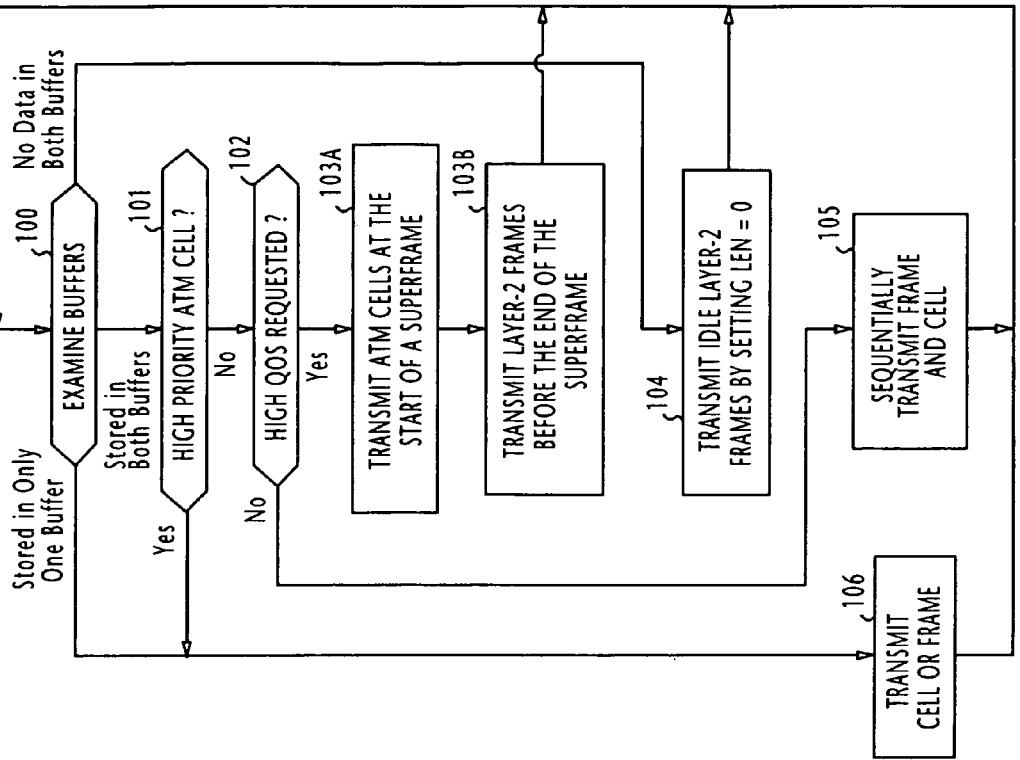
FIGS. 13 and 14 are flowcharts of the operation of the demultiplexer of the present invention.

The restriction of frame length imposed by the multiplexer 18 on the frame assembler at step 103 is a back-pressure control action generated in response to the header of cells stored in buffer 90. This back-pressure control at step 103 is modified as steps 103A and 103B as shown in FIG. 14. In this modification, a superframe (or hypothetical frame) is defined. When an ATM cell stored in buffer 90 is requesting high QoS parameter (step 102), the controller 92 forwards a plurality of ATM cells from buffer 90 at the start of a superframe (step 103A) and then forwards a plurality of layer-2 frames before the end of the superframe.

Figure 15:
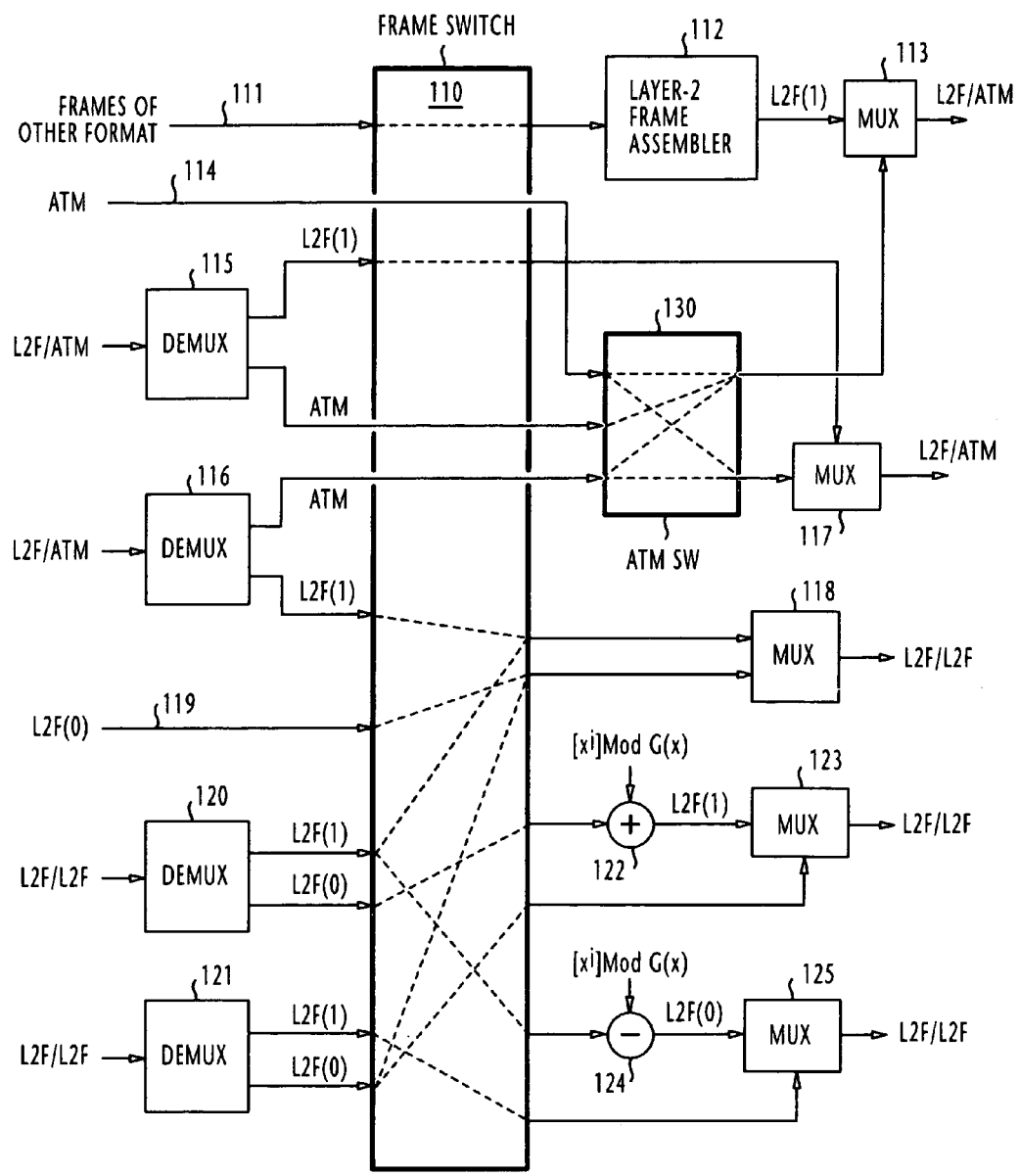
FIG. 15 is a block diagram of a transmission system incorporating the basic elements of the present invention.

FIG. 15 is a block diagram of a transmission system that incorporates the layer-2 frame assembler. HEC converter, asynchronous multiplexer and demultiplexer of the present invention, in addition to an HEC re-converter which will be described later.

The transmission system of FIG. 15 includes a frame switch 110 and an ATM switch 130. In each of the frame and ATM switches routing information contained in the header of an incoming frame/cell is used for routing the frame/cell to a destination output port. One of the input ports 111 of the frame switch receives frames of format which differs from the format of the layer-2 frame of this invention. A layer-2 frame assembler 112 is connected to one of the output ports of frame switch 110 to convert the frame arriving on input port 111 to a layer-2 frame of type 1. An asynchronous multiplexer 113 combines the output of assembler 112 with ATM cells supplied from the ATM switch 130.

A first pair of demultiplexers 115 and 116 is provided. Each of these multiplexers supplies a multiplex of frame/cell hybrid signals. The outputs of these multiplexers can be interchanged with other frames/cells through the frame switch 110 and ATM switch 130. An ATM cell stream may be applied through port 114 to the ATM switch 130 for routing to the multiplexer 113 or a multiplexer 117. ATM cells from the demultiplexers 115 and 116 can be routed through the ATM switch 130 to the multiplexers 113 and 117 where they are multiplexed again with layer-2 frames which are different from those with which they are previously multiplexed. Layer-2 frames of type 1 from the demultiplexers 115 and 116 can be routed through the frame switch 110 to the multiplexers 117 and 118 where they are multiplexed again with ATM cells and layer-2 frames of type 0 arriving on port 119.

A second pair of demultiplexers 120 and 121 supplies a multiplex of layer-2 frames of type 1 and type 0. Layer-2 frame of type 1 from the demultiplexer 120 can be multiplexed with the layer-2 frame of type 0 from the demultiplexer 121 in the multiplexer 118. Layer-2 frames of type 0 from the demultiplexers 120 and 121 can be multiplexed in a multiplexer 123 after converting one of these frames to a type-1 frame in an HEC converter 122, and the layer-2 frames of type 1 from the demultiplexers 120 and 121 can be multiplexed in a multiplexer 125 after converting one of these to a type-0 frame in an HEC re-converter 124 which removes the $[x^r]$ Mod $G(x)$ component from the type-1 in a manner to be described below.

Figure 16:
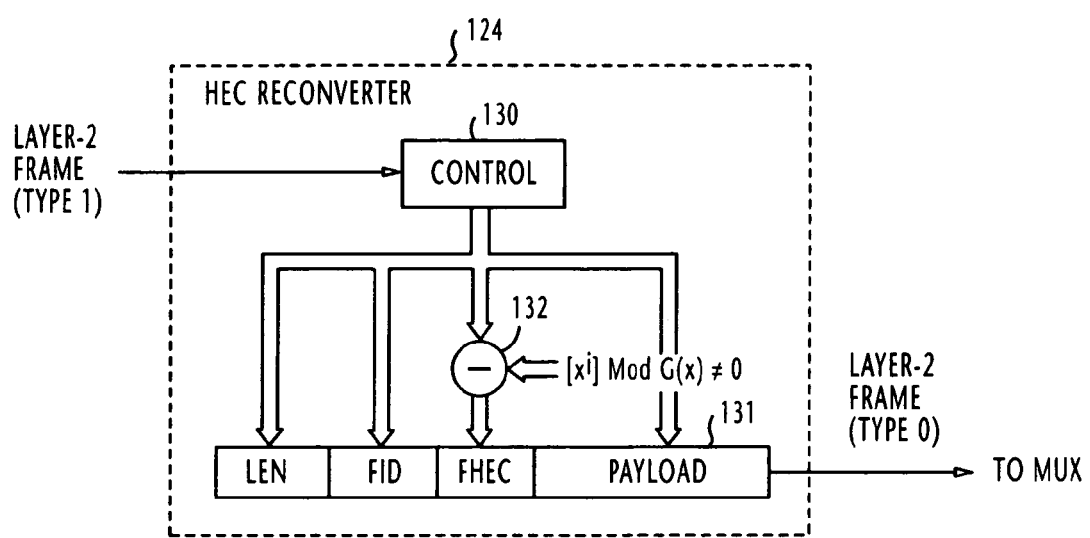
FIG. 16 is a block diagram of the HEC re-converter used in the transmission system of FIG. 15.

HEC re-converter 124 provides a process inverse to that the HEC converter since it subtracts the hypothetical modulo component $[x^r]$ Mod $G(x)$ from the layer-2 frame of type 1. As shown in FIG. 16, the HEC re-converter 124 is comprised of a controller 130, a shift register 131 and a subtractor 132. Controller 130 stores the field data of a layer-2 frame of type 1 into corresponding fields of shift register 131 except for the header error check code. This error check code is supplied to the subtractor 132, where the non-zero hypothetical remainder $[x^r]$ Mod $G(x)$ is removed and then stored in the FHEC field of shift register 131. In this way, the frame stored in the shift register 131 is a type-0 layer-2 frame that can be statistically multiplexed with layer-2 frames of type 1 whose header error check code is summed with the non-zero hypothetical remainder.

What is claimed is:

1. A communication method comprising the steps of:
   a) receiving a first data unit containing first header bits of a first payload signal and a first error check code representing a remainder of division of said first header bits by a generator polynomial, said first header bits being equal in number to second header bits of a second payload signal of a second data unit, said generator polynomial being used to divide the second header bits to produce a second error check code;
   b) summing a remainder of division of hypothetical header bits by said generator polynomial to said first error check code, said hypothetical header bits being greater in number than said first header bits; and
   c) distinguishing between the received first data unit and a received second data unit based on different error check results between the received first data unit and the received second data unit.

2. A communication method comprising the steps of:
   a) producing, for a first payload signal of a first data unit, first header bits equal in number to second header bits of a second payload signal of a second data unit;
   b) dividing said first header bits by a generator polynomial to produce a first error check code, said generator polynomial being equal to a generator polynomial with which said second header bits are divided to produce a second error check code;
   c) producing a sum of a remainder of division of hypothetical header bits by said generator polynomial to said first error check code, said hypothetical header bits being greater in number than said first header bits;
   d) forming said first data unit with said first header bits, said sum and said first payload signal; and
   e) distinguishing between a received first data unit and a received second data unit based on different error check results between the received first data unit and the received second data unit.

3. The communication method of claim 2, further comprising, between steps (b) and (c), the steps of:
   transmitting the first data unit containing said first header bits, said first error check code and said first payload signal through a transmission medium; and
   receiving the first data unit through the transmission medium.

4. The communication method of claim 1, 2 or 3, further comprising the step of asynchronously multiplexing the first data unit and the second data unit onto a common medium.

5. The communication method of claim 4, wherein said second data unit is received from a signal source.

6. The communication method of claim 4, wherein said second data unit is produced by the steps of:
   receiving a bit stream and forming said second payload signal therefrom;
   forming, for said second payload signal, said second header bits;
   dividing the second header bits by said generator polynomial to produce a remainder as said second error check code;
   forming said second data unit with said second header bits, said second error check code and said second payload signal.

7. The communication method of claim 1, 2 or 3, wherein said hypothetical header bits comprise higher-significant bits of non-zero value and all-zero lower significant bits equal in number to the first header bits plus the first error check code.

8. The communication method of claim 1, 2 or 3, wherein said hypothetical header bits correspond in number to the maximum degree of an irreducible polynomial.

9. The communication method of claim 4, wherein the multiplexing step comprises the step of limiting the amount of information carrier by the multiplexed first data unit when said second data unit is requesting high quality of service.

10. The communication method of claim 4, wherein the multiplexing step comprises the step of transmitting an idle data unit when said first and second data units are not present on said common medium.

11. The communication method of claim 4, wherein the multiplexing step comprises the step of transmitting said second data unit immediately following start timing of a superframe and transmitting said first data unit following the transmission of the second data units when said second data units are requesting high quality of service.

12. The communication method of claim 4, wherein the second data units comprise a plurality of ATM cells, wherein the multiplexing step comprises the step of transmitting said ATM cells immediately following start timing of a superframe and transmitting said first data unit following the transmission of the ATM cells when said ATM cells are requesting high quality of service.

13. The communication method of claim 4, further comprising the steps of:
   A) receiving a multiplexed signal via said common medium;
   B) performing an error check on a sequence of header bits and an header error check code of the received signal by using said generator polynomial to produce an error check result of said second data unit;
   C) summing said remainder of division of said hypothetical header bits by said generator polynomial to the result of step (B) to produce an error check result of said first data unit; and
   D) making a decision as to whether the received signal corresponds to said first data unit or said second data unit depending on the error check results of steps (B) and (C).

14. The communication method of claim 4, wherein a constant value is further summed to the first error check code and to said second error check code.

15. The communication method of claim 14, further comprising:
A) receiving a multiplexed signal via said common medium;
B) performing an error check on a sequence of header bits and an header error check code of the received signal of using said generator polynomial to produce a result and summing said constant value to said result to produce an error check result of said second data unit;
C) summing said constant value and said remainder of division of said hypothetical header bits by said generator polynomial to the result of step (B) to produce an error check result of said first data unit; and
D) making a decision as to whether the received signal corresponds to said first data unit or said second data unit depending on the error check results of steps (B) and (C).

16. The communication method of claim 13, wherein the step (D) comprises the steps of:
identifying the received data unit as said first data unit in the presence of a one-bit error in the error check result of step (B) and no bit error in the error check result of step (C); and
identifying the received data unit as said second data unit in the presence of a one-bit error in the error check result of step (C) and no bit error in the error check result of step (B).

17. The communication method of claim 13, wherein the step (D) comprises the steps of:
identifying the received data unit as said first data unit in the presence of a two-bit error in the error check result of step (B) and a one-bit error in the error check result of step (C);
correcting the one-bit error of said first data unit;
identifying the received data unit as said second data unit in the presence of a two-bit error in the error check result of step (C) and a one-bit error in the error check result of step (B); and
correcting the one-bit error of said second data unit.

18. The communication method of claim 13, wherein the step (D) comprises the steps of: $D_1$) identifying the received data unit as said first data unit if a one-bit error is detected by step (B) and no bit error is detected by step (C), or identifying the received data unit as said second data unit if a one-bit error is detected by step (C) and no bit error is detected by step (B);
$D_2$) repeating step ($D_1$) a predetermined number of times;
$D_3$) identifying the received data unit as sad first data unit if a one-bit error is detected by step (B) and no bit error is detected by step (C), or a two-bit error is detected by step (B) and a one-bit error is detected by step (C), and correcting the one-bit error of said first data unit;
$D_4$) identifying the received data unit as said second data unit if a one-bit error is detected by step (C) and no bit error is detected by step (B), or a two-bit error is detected by step (C) and a one-bit error is detected by step (B), and correcting the one-bit error if said data unit; and
$D_5$) returning to step ($D_1$) if the error check results of steps (B) and (C) are other than the error check results given by steps ($D_3$) and ($D_4$).

19. The communication method of claim 15, wherein the step (D) comprises the steps of:
identifying the received data unit as said first data unit in the presence of a one-bit error in the error check result of step (B) and no bit error in the error check result of step (C); and
identifying the received data unit as said second data unit in the presence of a one-bit error in the error check result of step (C) and no bit error in the error check result of step (B).

20. The communication method of claim 15, wherein the step (D) comprises the steps of:
identifying the received data unit as said first data unit in the presence of a two-bit error in the error check result of step (B) and a one-bit error in the error check result of step (C);
correcting the one-bit error of said first data unit;
identifying the received data unit as said second data unit in the presence of a two-bit error in the error check result of step (C) and a one-bit error in the error check result of step (B); and
correcting the one-bit error of said second data unit.

21. The communication method of claim 15, wherein the step (D) comprises the steps of:
$D_1$) identifying the received data unit as said first data if a one-bit error is detected by step (B) and no bit error is detected by step (C), or identifying the received data unit as said second data unit if a one-bit error is detected by step (C) and no bit error is detected by step (B);
$D_2$) repeating step ($D_1$) a predetermined number of times;
$D_3$) identifying the received data unit as said first data unit if a one-bit error is detected by step (B) and no bit error is detected by step (C), or a two-bit error is detected by step (B) and a one-bit error is detected by step (C) and correcting the one-bit error of said first data unit; and
$D_4$) identifying the received data unit as said second data unit if a one-bit error is detected by step (C) and no bit error is detected by step (b), or a two-bit error is detected by step (C) and a one-bit error is detected by step (B) and correcting the one-bit error of said second data unit; and
$D_5$) returning to step ($D_1$) if the error check results of steps (B) and (C) are other then the error check results given by steps ($D_3$) and ($D_4$).

22. The communication method of claim 1, 2 or 3, further comprising the steps of:
receiving said first data unit containing the first error check code with said remainder; and
subtracting said remainder from the received first data unit, whereby the received first data unit is converted to a data unit which can be distinguished from a data unit which is identical in format to the received first data unit by different error check results.

23. The communication method of claim 19, further comprising the steps of receiving a third data unit identical in format to the received first data unit and asynchronously multiplexing the third data unit with the converted first data unit.

24. A communication circuit comprising:
a storage circuit including a first field for storing first header bits of a first payload signal of a first data unit, a second field containing a first error check code resulting from division of said first header bits by a generator polynomial, and a third field for storing said first payload signal, said first header bits being equal in number to second header bits of a second payload signal of a second data unit, and said generator polynomial being used to divide the second header bits to produce a second error check code; and
an adder circuit for summing a remainder of division of hypothetical header bits by said generator polynomial to said first error check code, said hypothetical header bits being greater in number than a total number of bits in said first and second fields, whereby the first data unit can be distinguished from the second data unit by different error check results of said first and second data units.

25. A communication circuit comprising:
a storage circuit including a first field for storing first header bits of a first payload signal of a first data unit, a second field containing a first error check code resulting from division of said first header bits by a generator polynomial, and a third field for storing said first payload signal, said first header bits being equal in number to second header bits of a second payload signal of a second data unit, and said generator polynomial being used to divide the second header bits to produce a second error check code;
division circuitry for dividing the first header bits by said generator polynomial to produce said first error check code; and
adder circuitry for summing a remainder of division of hypothetical header bits by said generator polynomial to said first error check code to produce a sum and inserting the sum into said second field of the storage circuit, the hypothetical header bits being greater in number than a total number of bits in said first and second fields, whereby the first and second data units can be distinguished from each other by different error check results of the first and second data units.

26. The communication circuit of claim 25, further comprising transmit/receive circuitry for transmitting said first data unit containing said first header bits, said first error check code and said first payload signal through a transmission medium, receiving the transmitted first data unit through the transmission medium and supplying the first error check code contained in the received first data unit to said adder circuitry.

27. The communication circuit of claim 24, 25 or 26, wherein said hypothetical header bits comprise higher-significant bits of non-zero value and all-zero lower significant bits equal in number to the first header bits plus the first error check code.

28. The communication circuit of claim 24, 25 or 26, wherein said hypothetical header bits correspond in number to the maximum degree of an irreducible polynomial.

29. The communication circuit of claim 25 or 26, further comprising an asynchronous multiplexer for multiplexing said first data unit with said second data unit onto a common medium.

30. The communication circuit of claim 29, wherein said second data unit is received from a signal source.

31. The communication circuit of claim 29, further comprising:
a second storage circuit including a first field for storing said second header bits, a second field, and a third field for storing said second payload signal, said second storage circuit formulating a second data unit with information stored in the first, second and third fields; and
second division circuitry for dividing said second header bits by said generator polynomial to produce said second error check code and inserting the second error check code in the second field of the second storage circuit.

32. The communication circuit of claim 29, wherein the asynchronous multiplexer is arranged to limit the amount of information carried by the multiplexed first data unit when said second data unit is requesting high quality of service.

33. The communication circuit of claim 29, wherein the asynchronous multiplexer is arranged to transmit an idle data unit when said first and second data units are not present on said common medium.

34. The communication circuit of claim 29, wherein the asynchronous multiplexer is arranged to transmit said second data unit immediately following start timing of a superframe and transmitting said first data unit following the transmission of the second data unit when said second data units are requesting high quality of service.

35. The communication circuit of claim 29, wherein the second data unit comprises a plurality of ATM cells, wherein the asynchronous multiplexer is arranged to transmit said ATM cells immediately following start timing of a superframe and transmit said first data unit following the transmission of the ATM cells when said ATM cells are requesting high quality of service.

36. The communication circuit of claim 29, further comprising:
a second storage circuit for receiving a multiplexed data unit via said common medium;
second division circuitry connected to the storage circuit for performing an error check on a sequence including header bits and a header error check code of the received data unit by said generator polynomial to produce a first error check result for said second data unit;
second adder circuitry for summing, to said error check result of said second data unit, said remainder of division of said hypothetical header bits by said generator polynomial to produce a second error check result for said first data unit; and
decision circuitry for making a decision as to whether the received data unit corresponds to said first data unit or said second data unit depending on said first and second results.

37. The communication circuit of claim 29, wherein a constant value is summed to said first error check code and to said second error check code.

38. The communication circuit of claim 37, further comprising:
a storage circuit for receiving a multiplexed data unit via said common medium;
division circuitry connected to the storage circuit for performing an error check on a sequence including header bits and an header error check code of the received data unit by said generator polynomial to produce an output signal;
a first adder for summing, to said output signal, said constant value to produce a first error check result for said second data unit; a second adder for summing, to said output signal, a sum of said constant value and a remainder of division of said hypothetical header bits by said generator polynomial to produce a second error check result for said first data unit; and
decision circuitry for making a decision as to whether the received data unit corresponds to said first data unit or said second data unit depending on said first and second results.

39. The communication circuit of claim 36, wherein said decision circuitry is arranged to:
identify the received signal as said first data unit in the presence of a one-bit error in said second error check result and no bit error in said first error check result, and
identify the received signal as said second data unit in the presence of a one-bit error in said first error check result and no bit error in said second error check result.

40. The communication circuit of claim 39, wherein said decision circuitry is further arranged to:
  identify the received signal as said first data unit in the presence of a two-bit error in said second error check result and a one-bit error in said first error check result,
  correct the one-bit error in said first data unit,
  identify the received signal as said second data unit in the presence of a two-bit error in said first error check result and a one-bit error in said second error check result, and
  correct the one-bit error in said second data unit.

41. The communication circuit of claim 36, further comprising control circuitry for controlling the position of the received data unit in said storage circuit according to the length of the received data unit.

42. The communication circuit of claim 38, wherein said decision circuitry is arranged to:
  identify the received signal as said first data unit in the presence of a one-bit error in said second error check result and no bit error in said first error check result, and
  identify the received signal as said second data unit in the presence of a one-bit error in said first error check result and no bit error in said second error check result.

43. The communication circuit of claim 42, wherein said decision circuitry is further arranged to:
  identify the received signal as said first data unit in the presence of a two-bit error in said second error check result and a one-bit error in said first error check result,
  correct the one-bit error in said first data unit,
  identify the received signal as said second data unit in the presence of a two-bit error in said first error check result and a one-bit error in said second error check result, and
  correct the one-bit error in said second data unit.

44. The communication circuit of claim 43, further comprising control circuitry for controlling the position of the received data unit in said storage circuit according to the length of the received data unit.

45. The communication circuit of claim 25 or 26, further comprising:
  a second storage circuit for receiving said first data unit containing said first header bits, said sum and said first payload signal; and
  a subtractor circuit for subtracting said remainder from said sum of the received first data unit, whereby the received first data unit is converted to a data unit which can be distinguished from a data unit identical in formal to the received first data unit by different error check results.

46. The communication circuit of claim 45, further comprising an asynchronous multiplexer for multiplexing the converted first data unit with a third data unit identical in format to the received first data unit.

* * * * *